United States Patent
Kuzumaki et al.

[11] Patent Number: 6,015,860
[45] Date of Patent: Jan. 18, 2000

[54] ACRYLIC ELASTOMER COMPOSITION

[75] Inventors: Yoshihiro Kuzumaki; Iwao Moriyama; Jun Okabe, all of Kitaibaraki, Japan

[73] Assignee: Nippon Mektron, Limited, Tokyo, Japan

[21] Appl. No.: 09/133,862

[22] Filed: Aug. 13, 1998

[30] Foreign Application Priority Data

Sep. 26, 1997 [JP] Japan ..................... 9-279958
Mar. 13, 1998 [JP] Japan ..................... 10-082593

[51] Int. Cl.⁷ ..................... C08L 33/08
[52] U.S. Cl. ..................... 525/123; 525/124; 525/340; 525/379
[58] Field of Search ..................... 525/123, 124, 525/340, 379

[56] References Cited

U.S. PATENT DOCUMENTS 3,912,672 10/1975 Morris et al. ..................... 525/340
5,008,337 4/1991 Patel ..................... 525/130
5,200,472 4/1993 Naraki .
5,777,029 7/1998 Horrion et al. ..................... 525/92 F

FOREIGN PATENT DOCUMENTS

0773267 A1 5/1997 European Pat. Off. .

Primary Examiner—Nathan M. Nutter
Attorney, Agent, or Firm—Barnes & Thornburg

[57] ABSTRACT

An acrylic elastomer composition, which comprises a carboxyl group-containing acrylic elastomer, a polyfunctional isocyanate compound or a blocked isocyanate, and at least one of a guanidine, a quaternary onium salt, a tertiary amine and a tertiary phosphine has an improved scorch resistance without lowering the normal state physical properties, heat resistance and compression set characteristics of the resulting vulcanization products, when the polyfunctional isocyanate used, or has an improved scorch resistance, particulary at high temperatures, without lowering the vulcanization speed when the blocked isocyanate is used.

11 Claims, No Drawings

ACRYLIC ELASTOMER COMPOSITION

BACKGROUND OF THE INVENTION

1. Field of the Invention

The present invention relates to an acrylic elastomer composition, and more particularly a carboxyl group-containing acrylic elastomer composition having an improved scorch resistance.

2. Description of Related Art

Acrylic elastomers have been so far widely used as vulcanization molding materials for sealing materials, hoses, electrical parts, etc. owing to their distinguished heat resistance, oil resistance, etc. In acrylic elastomers for use as such vulcanization molding materials, physical properties of vulcanization products largely depend on kinds of cross-linkable monomers in copolymerization or on kinds of cross-linking agents.

For example, when acrylic elastomers containing cross-linking site monomers having a double bond are vulcanized with sulfur (donor), the resulting vulcanization products are poor in heat resistance and weathering resistance because of the presence of unsaturated bonds in the molecule, and mold corrosion due to sulfides formed during the vulcanization is observable, though a high vulcanization speed can be attained. Acrylic elastomers containing epoxy groups as crosslinking sites have not only a low vulcanization speed, but also suffer from considerable changes in normal state physical properties due to the secondary vulcanization and are also poor in heat resistance and compression set characteristics.

Acrylic elastomers having carboxylic groups as crosslinking sites are generally subjected to amine vulcanization, and the resulting vulcanization products are distinguished in normal state physical properties, compression set characteristics, etc., but still have such a disadvantage as a short scorch time. To improve the productivity an injection molding process has been now widely used, where the scorch resistance is one of very important characteristics and thus a longer scorch time is now in increasing demand.

SUMMARY OF THE INVENTION

An object of the present invention is to provide an acrylic elastomer composition containing an acrylic elastomer having carboxylic groups as cross-linkable sites, which has an improved scorch resistance without lowering the normal state physical properties, heat resistance, compression set characteristics, etc. of the resulting molding products.

The object of the present invention can be attained by an acrylic elastomer composition, which comprises a carboxyl group-containing acrylic elastomer, a polyfunctional isocyanate compound, and a guanidine, a guaternary ammonium salt, a tertiary amine or a tertiary phosphine as a vulcanization accelerator. When a blocked isocyanate is used in place of the polyfunctional isocyanate compound in the acrylic elastomer composition, the scorch resistance, particulary at high temperatures, can be improved without lowering the vulcanization rate of the resulting molding products.

DETAILED DESCRIPTION OF THE INVENTION

Acrylic elastomers having carboxyl groups as cross-linkable sites can be obtained by copolymerizing at least one of alkyl acrylates and alkoxyalkyl acrylates as the main comonomer with a carboxyl group-containing unsaturated compound.

Alkyl acrylates for use in the present invention are those with an alkyl group having 1 to 8 carbon atoms, including, for example, methyl acrylate, ethyl acrylate, n- or iso-propyl acrylate, n- or iso-butyl acrylate, n-amyl acrylate, n-hexyl acrylate, 2-ethylhexyl acrylate, n-octyl acrylate, 2-cyanoethyl acrylate, etc. Preferable are ethyl acrylate and n-butyl acrylate.

Alkoxyalkyl acrylates for use in the present invention are those with an alkoxyalkyl group having 2 to 8 carbon atoms, including, for example, methoxymethyl acrylate, ethoxymethyl acrylate, 2-methoxyethyl acrylate, 2-ethoxyethyl acrylate, 2-butoxyethyl acrylate, etc. Preferable are 2-methoxyethyl acrylate and 2-ethoxyethyl acrylate.

About 20 to about 99.9% by weight, preferably about 40 to about 99% by weight, of at least one of the alkyl acrylates and alkoxyalkyl acrylates is used in the copolymerization reaction on the basis of total monomer mixture. Since the polymerization efficieny of copolymerization reaction is about 90% or more, the monomer mixing ratio substantially corresponds to the comonomer ratio of the resulting copolymer.

The carboxyl group-containing unsaturated compound for use in the present invention includes, for example, monocarboxylic acids such as acrylic acid, methacrylic acid, etc.; dicarboxylic acids such as maleic acid, fumaric acid, itaconic acid, citraconic acid, etc.; and dicarboxylic acid monoesters such as monomethyl maleate, monoethyl maleate, monobutyl maleate, monomethyl fumarate, monoethyl fumarate, monobutyl fumarate, etc. Preferable are monoethyl maleate and monoethyl fumarate. About 0.1 to about 15% by weight, preferably about 1 to about 10% by weight, of the carboxyl group-containing unsaturated compound is used for the copolymerization on the basis of total monomer mixture.

Besides the foregoing comonomers, not more than about 80% by weight, preferably not more than about 60% by weight,of a copolymerizable unsaturated compound, for example a vinyl compound such as vinyl chloride, vinylidene chloride, acrylonitrile, styrene, vinyl acetate, ethyl vinyl ether, butyl vinyl ether, phenyl (meth)acrylate, etc.; a monoolefin such as ethylene, propylene, etc.; and a diolefin such as butadiene, isoprene, chloroprene, etc. may be used for the copolymerization.

The acrylic elastomer, which is a copolymer of these comonomers, can be admixed with a polyfunctional polyisocyanate compound and a vulcanization accelerator.

The polyfunctional polyisocyanate compound for use in the present invention can be represented by the following general formula:

where R represents an alkyl group, an alkoxyl group, an aryl group, an alkylaryl group or an aralkyl group and n is an integer of 2 or more, and includes, for example, o-tolylene diisocyanate, naphthylene 1,5-diisocyanate, diphenylmethane diisocyanate, triphenylmethane triisocyanate, xylylene diisocyanate, tris(p-isocyanatophenyl) thiophosphite, polymethylene polyphenyl diisocyanate, chlorophenyldiisocyanate, dimethoxy diphenyl diisocyanate, dimethyl diphenylene diisocyanate, tetramethyl diphenylene diisocyanate, diphenyl diphenylene diisocyanate, dichloro diphenylene diisocyanate, dimethoxy diphenylene diisocyanate, phenylene diisocyanate, toluene diisocyanate, transvinylene diisocyanate, N,N'-(4,4'-dimethyl-3,3'-diphenyl diisocyanate)uredion, 4,4',4"-trimethyl-3,3',3"-triisocyanate-2,4,6-triphenyl cyanurate, hexamethylene diisocyanate, isophorone diisocyanate, trimethyl hexamethylene diisocyanate, dicyclohexylmethane diisocyanate, adduct-typed hexamethylene diisocyanate, biuret-typed hexamethylene diisocyanate, isocyanurate-typed hexamethylenediisocyanate, adduct-typed tolylene diisocyanate, biuret-typed tolylene diisocyanate, isocyanurate-typed tolylene diisocyanate, etc.

About 0.1 to about 10 parts by weight, preferably about 0.2 to about 5 parts by weight, of at least one of the polyfunctional polyisocyanate compounds can be used per 100 parts by weight of the acrylic elastomer. Below about 0.1 parts by weight, vulcanization torque, normal state physical properties and compression set characteristics will be lowered, whereas above about 10 parts by weight the effect on scorch resistance improvement will be decreased.

When a blocked isocyanate is used in place of the polyfunctioned polyisocyanate compound, the scorch resistance, particularly at high temperatures, can be effectively improved without lowering the vulcanization speed.

When the polyfunctional polyisocyanate compound is used alone, the vulcanization speed is low at low temperatures, and when it is taken into account to carry out molding at high temperatures to enhance the vulcanization speed, the scorch resistance of the composition is not satisfactory yet. Generally, the scorch time is short in a vulcanization system having a high vulcanization speed, whereas it is long in a vulcanization system having a low vulcanization speed, and thus it has been considered difficult to satisfy both scorch resistance and vulcanization speed at the same time. It is important for obtaining a good processing stability in the rubber vulcanization molding to satisfy these two at the same time. Use of blocked isocyanate can satisfy these two requirements at the same time.

The blocked isocyanate for use in the present invention is a compound obtained by reaction of the polyfunctional isocyanate compound aforementioned with a blocking agent.

The blocking agent for use in reaction with the polyfunctional isocyanate compound according to the present invention includes, for example, an amine such as diphenylamine, bis(dimethylbenzyl)-diphenylamine, methylphenylamine, ethtylphenylamine, phenylisopropylamine, phenylnaphthylamine, naphthylphenylenediamine, diphenylphenylenediamine, dinaphthylphenylenediamine, N-phenyl-N'-methylphenylenediamine, N-phenyl-N'-ethylphenylenediamine, N-phenyl-N'-isopropylphenylenediamine, aniline, carbazole, etc.; a phenol such as phenol, cresol, xylenol, p-ethylphenol, o-isopropylphenol, p-tert.-butylphenol, p-tert.-octylphenol, 2,6-di-tert.-butyl-4-methylphenol, 2,6-di-tert.-butyl-4-ethylphenol, methylene-bis(ethyl-tert.-butylphenol), 2,5-di-tert.-butylhydroquinone, thymol, naphthol, nitrophenol, chlorophenol, etc.; an alcoloh such as methanol, ethanol, propanol, butanol, ethyleneglycol, methylcellosolve, butylcellosolve, methylcarbitol, benzyl alcohol, phenylcellosolve, cyclohexanol, etc.; an active methylene such as dimethyl malonate, diethyl malonate, ethyl acetoacetate, etc.; a mercaptan such as butylmercaptan, laurylmercaptan, thiophenol, etc.; an amide such as acetanilide, acetoanisidide, acetamide, benzamide, sulfenamide, etc.; an imide such as succinimide, maleinimide, etc.; an imidazole such as imidazole, ethylimidazole, mercaptobenzimidazole, etc,; an urea such as urea, ethyleneurea, thiourea, etc.; a carbamate such as phenyl phenylcarbamate, oxazolidone, etc.; an imine such as ethyleneimine, etc.; an oxime such as formaldoxime, acetoaldoxime, methylethylketoxime, cyclohexanonxime, etc.; a guanidine such as diphenylguanidine, ditolylguanidine, tolyl biguanide, etc.; a sulfite such as sodium hydrogen sulfite, potassium hydrogen sulfite, etc.; and a lactam such as ε-caprolactam, etc. The blocking agent can be selected in view of decomposition temperature, etc. as in the case of the polyfunctional isocyanate.

About 0.1 to about 15 parts by weight, preferably about 0.2 to about 8 parts by weight, of at least one of these blocking agents can be used per 100 parts by weight of the acrylic elastomer. Below about 0.1 parts by weight the vulcanization torque, normal state physical properties and compression set characteristics will be lowered, whereas above about 15 parts by weight the effect on improvement of scorch resistance will be low.

It is preferable to use the polyfunctional isocyanate compound or blocked isocyanate together with a vulcanization accelerator. Such a vulcanization accelerator for use in the present invention includes at least one of a guanidine, a quaternary onium salt, a tertiary amine and a tertiary phosphine.

The guanidine for use in the present invention includes, for example, guanidine and its sustitution products such as aminoguanidine, 1,1,3,3-tetramethylguanidine, n-dodecylguanidine, methylolguanidine, dimethylolguanidine, 1-phenylguanidine, 1,3-diphenylguanidine, 1,3-di-o-tolylguanidine, triphenylguanidine, 1-benzyl-2,3-dimethylguanidine, cyanoguanidine, etc. Besides, 1,6-guadinohexane, guanylurea, biguanide, 1-o-tolyl biguanide, etc. can be also used.

The quaternary onium salt for use in the present invention can be represented by the following general formula:

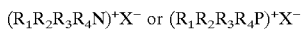

where $R_1$ to $R_4$ each represent an alkyl group, an alkoxy group, an aryl group, an alkylaryl group, an aralkyl group, or a polyoxyalkylene group, having 1 to 25 carbon atoms, respectively, 2 or 3 of whose groups may form a heterocyclic structure together with P or N; $X^-$ represents an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{--}$, etc., wherein R represents an alkyl group having 1 to 18 carbon atoms, and includes, for example, a quaternary ammonium salt such as tetrabutylammonium bromide, tetrabutylammonium chloride, tetrabutylammonium iodide, tetraethylammonium bromide, tetraethylammonium chloride, tetraethylammonium iodide, n-dodecyltrimethylammonium bromide, octadecyltrimethylammonium bromide, trimethylbenzylammonium bromide, cetyldimethylbenzylammonium chloride, cetylpyridinium bromide, cetylpyridinium sulfate, tetraethylammonium acetate, trimethylbenzylammonium benzoate, trimethylbenzylammonium borate, 5-benzyl-1,5-diazabicyclo[4,3,0]-5-nonenium chloride, 5-benzyl-1,5-diazabicyclo[4,3,0]-5-nonenium tetrafluoroborate, etc., or a quaternary phosphonium salt such as tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc.

The tertiary amine for use in the present invention includes, for example, trimethylamine, tributylamine, diethylcyclohexylamine, dimethyllaurylamine, tetramethylethylenediamine, tetramethylpropylenediamine, tetramethylhexamethylenediamine, N,N-dimethylbenzylamine, triphenylamine, triethylenediamine, hexamethylenetetramine, pentamethyldiethylenetriamine, hexamethyltriethylenetetramine, 1,8-diazabicyclo[5,4,0]-undecene-7, N,N-dimethylanilin, N,N-diethylaniline, pyridine and its substitution products, pyrrole and its substitution products, methylmorpholine, ethylmorpholine, dimethylpiperazine, diethylpiperazine, etc.

The tertiary phosphine for use in the present invention includes, for example, triphenyl phosphine, tri(methylphenyl)phosphine, etc.

About 0.5 to about 15 parts by weight, preferably about 1 to about 10 parts by weight, of the vulcanization accelerator can be used per 100 parts by weight of the carboxyl group-containing acrylic elastomer. In case of the blocked isocyanate, vulcanization can be carried out to a satisfactory degree without using the vulcanization accelerator, but simultaneous use of the vulcanization accelerator can more effectively improve the scorch resistance.

The acrylic elastomer composition comprising the foregoing components according to the present invention can be prepared by kneading in Banbury mixer, open rolls, etc. upon addition thereto of an antioxant, a softening agent, a dispersing agent, a processing aid, a lubricant, etc., if required. Vulcanization of the kneaded mixture is carried out by heating at about 150° to about 200° C. for about 0.5 to about 15 minutes, if necessary, followed by oven vulcanization (secondary vulcanization) at about 150° to about 200° C. for about 1 to about 20 hours.

The present acrylic elastomer composition has an improved scorch resistance without lowering the normal state physical properties, heat resistance, compression set characteristics, etc. of the vulcanization products. Thus, the present composition can serve as a vulcanization molding material capable of undergoing not only compression molding but also injection molding.

Particularly by using a blocked polyfunctional isocyanate compound in place of the polyfunctional isocyanate compound, the scorch resistance, particularly at high temperatures, can be improved while rather increasing the vulcanization speed and also the 100% modulus values can be improved at the same time. These improvement effects are more pronounced when the blocked isocyanate is used together with the vulcanization accelerator. Better processing stability can be obtained at the same time.

PREFERRED EMBODIMENTS OF THE INVENTION

The present invention will be described in detail below, referring to Examples.

EXAMPLE 1

100 parts by weight of elastomer A obtained by copolymerization of a monomer mixture consisting of 46% by weight of ethyl acrylate, 30% by weight of n-butyl acrylate, 20% by weight of 2-methoxyethyl acrylate and 4% by weight of monoethyl maleate was admixed with:

| | |
|---|---|
| FEF carbon black | 65 parts by wt. |
| Stearic acid | 1 " |
| 4,4'-bis(α,α-dimethylbenzyl)diphenylamine (Nocrack CD, trademark of a product commercially available from Ouchi Shinko Kagaku K.K., Japan) | 2 " |
| Processing aid (Phosphanol RL-210, trademark of a product commercially available from Toho Kagaku K.K., Japan) | 0.5 " |
| Hexamethylene diisocyanate | 1 " |
| Di-o-tolylguanidine | 4 " | and kneaded in open rolls. The resulting kneaded mixture was subjected to press vulcanization at 180° C. for 8 minutes and then to oven vulcanization at 175° C. for 15 hours.

The kneaded mixture and vulcanization product determined for the following items:

Scorch time $t_5$: measurement of Mooney scorch of kneaded mixture at 125° C.

Normal state physical properties: according to JIS K-6301

Heat resistance: measurement of changes in the normal state physical properties after heating at 175° C. for 70 hours Compression set: according to JIS K-6301

EXAMPLE 2

In Example 1, the amount of hexamethylene diisocyanate was changed to 0.6 parts by weight and one part by weight of dimethylbenzylamine was used in place of di-o-tolylguanidine.

EXAMPLE 3

In Example 1, the amount of hexamethylene diisocyanate was changed to 0.6 parts by weight and 3 parts by weight of cetylbenzylammonium chloride was used in place of di-o-tolylguanidine.

EXAMPLE 4

In Example 1, 0.8 parts by weight of dimethyldiphenylene diisocyanate was used in place of hexamethylene diisocyanate and the amount of di-o-tolylguanidine was changed to 2 parts by weight.

EXAMPLE 5

In Example 1, an acrylic elastomer B obtained by copolymerization of a monomer mixture consisting of 55% by weight of ethylene, 41% by weight of methyl acrylate and 4% by weight of monoethyl maleate was used in place of the acrylic elastomer A, and the amount of di-o-tolylguanidine was changed to 3 parts by weight.

Compartive Examples 1

In Example 1, the amount of hexamethylene diisocyanate was change to 2 parts by weight and 0.7 parts by weight of diaminodiphenyl ether was used in place of di-o-tolylguanidine.

Compartive Examples 2

In Example 1, an acrylic elastomer C obtained by copolymerization a monomer mixture consisting of 47% by weight of ethyl acrylate, 30% by weight of n-butyl acrylate, 20% by weight of 2-methoxyethyl acrylate and 3% by weight of glycidyl methacrylate was used in place of the acrylic elastomer A, and one part by weight of diphenylurea, one part by weight of mercaptobenzothiazole cyanurate and 2 parts by weight of alkyltrimethylphosphonium bromide (C-STB, trademark of a product commercially available from Toho Kagaku K.K., Japan) were used in place of hexamethylene diisocyanate and di-o-tolylguanidine, respectively.

Compartive Examples 3

In Example 1, an acrylic elastomer D obtained by copolymerization of a monomer mixture consisting of 47% by weight of ethyl acrylate, 25% by weight of n-butyl acrylate, 25% by weight of 2-methoxyethyl acrylate and 3% by weight of vinyl chloroacetate was used in place of the acrylic elastomer A, and 50 parts by weight of HAF carbon black was used in place of FEF carbon black. 0.5 parts by weight of 2,4,6-trimercapto-s-triazine (Nocseler TCA, trademark of a product commercially available from Ouchi Shinko Kagaku K.K., Japan) and 1.5 parts by weight of zinc dibutyldithiocarbamate (Nocceler TCA, trademark of a product commercially available from the same company as mentioned just above) were used in place of hexamethylene diisocyanate and di-o-tolylguanidine, respectively.

Results of determination in Examples 1 to 5 and Comparative Examples 1 to 3 are shown in the following Table 1.

sized from di-o-tolylguanidine and hexamethylene diisocyanate) was used as the blocked isocyanate.

Compartive Example 4

In Example 6, 0.7 parts by weight of diaminodiphenyl ether was used in place of the blocked isocyanate, and the amount of di-o-tolylguanidine was changed to 0.7 parts by weight.

Compartive Example 5

In Example 6, an acrylic elastomer B obtained by copolymerization of a monomer mixture consisting of 48% by weight of ethyl acrylate, 30% by weight of n-butyl acrylate, 20% by weight of 2-methoxyethyl acrylate and 2% by

TABLE 1

| Determination Item | | Example No. | | | | | Comp. Ex. No. | | |
|---|---|---|---|---|---|---|---|---|---|
| | | 1 | 2 | 3 | 4 | 5 | 1 | 2 | 3 |
| [Scorch resistance] | | | | | | | | | |
| $t_5$ | (min.) | 15.7 | >20 | >20 | >20 | >20 | 6.7 | 6.5 | 5.6 |
| [Normal state physical properties] | | | | | | | | | |
| Hardness | (JIS A) | 74 | 65 | 71 | 74 | 80 | 76 | 71 | 68 |
| 100% Modulus | (MPa) | 5.0 | 2.2 | 3.1 | 4.0 | 5.4 | 6.1 | 7.6 | 5.9 |
| Tensile strength | (MPa) | 12.3 | 7.4 | 10.1 | 10.9 | 17.2 | 12.0 | 11.8 | 13.8 |
| Elongation | (%) | 210 | 440 | 310 | 260 | 370 | 170 | 190 | 230 |
| [Heat resistance] | | | | | | | | | |
| Hardness change | (points) | 2 | −3 | 1 | 1 | 1 | 1 | 8 | 11 |
| 100% modulus change | (%) | −14 | −35 | −34 | −19 | −13 | −10 | 27 | 25 |
| Tensile strength change | (%) | −17 | −71 | −50 | −32 | −19 | −8 | 7 | −7 |
| Elongation change | (%) | 10 | 13 | 10 | 12 | −3 | 6 | −10 | −17 |
| [Compression set] | | | | | | | | | |
| JIS-Block | (%) | 15 | 7 | 13 | 8 | 10 | 7 | 15 | 18 |

EXAMPLE 6

In Example 1, 3 parts by weight of blocked isocyanate (Desmodur TPLS-2957, trademark of a product commercially available from Sumitomo-Bayer Urethane Co., Japan) was used in place of one part by weight of hexamethylene-diisocyanate and the amount of di-o-tolylguanidine was changed to 2 parts by weight.

The resulting kneaded mixture and vulcanization product were determined for the following items besides the scorch time, normal state physical properties and compression set:
Vulcanization speed Tc90: Time till 90% of maximun torgue, measured by curastometer
Processability: 200° C., one minute press vulcanized sheet (thickness: 2 mm) was tested, and evaluated as mark "○" for smooth surface without any roughening and "X" for roughed or foamed surface

EXAMPLE 7

In Example 6, the amount of blocked isocyanate was changed to 5 parts by weight.

EXAMPLE 8

In Example 6, 2.5 parts by weight of Clarene VPLS-2256 (trademark of a product commercially available from Sumitomo-Bayer Urethane Co., Japan) was used as the blocked isocyanate.

EXAMPLE 9

In Example 6, 4 parts by weight of blocked hexamethylene-diisocyanate (blocked isocyanate syntheweight of glycidyl methacrylate was used in place of the acrylic elastomer A, and 2 parts by weight of zinc dimethyldithiocarbamate (Nocceler PZ, trademark of a product commercially available from Ouchi Shinko Kagaku K.K., Japan) and one part by weight of ferric dimethyldithiocarbamate (Nocceler TTFE of a product commercially available from the same company as mentioned just above) were used in place of the blocked isocyanate and di-o-tolylguanidine, respectively. The secondary vulcanization time was also changed to 4 hours.

Compartive Example 6

In Example 6, an acrylic elastomer C obtained by copolymerization of a monomer mixture consisting of 47% by weight of ethyl acrylate, 30% by weight of n-butyl acrylate, 20% by weight of 2-methoxyethyl acrylate and 3% by weight of vinyl chloroacetate was used in place of the acrylic elastomer A, and 0.5 parts by weight of 2,4,6-trimercapto-s-triazine (Nocceler TCA, trademark of a product commercially available from Ouchi Shinko Kagaku K.K., Japan) and zinc dibutyldithiocarbamate (Nocceler BZ, trademark of a product commercially available from the same company as mentioned just above) were used in place of the blocked isocyanate and di-o-tolylguanidine, respectively. The secondary vulcanization time was also changed to 4 hours.

Results of determinations in the foregoing Examples 6 to 9 and Comparative Examples 4 to 6 are shown in the following Table 2.

TABLE 2

| Determination and Evaluation Items | | Example No. | | | | Comp. Ex. No. | | |
|---|---|---|---|---|---|---|---|---|
| | | 6 | 7 | 8 | 9 | 4 | 5 | 6 |
| [Scorch resistance $t_5$] | | | | | | | | |
| 125° C. | (min.) | >30 | >30 | >30 | 17.5 | 6.5 | 9.2 | 5.6 |
| 135° C. | (min.) | >30 | >30 | >30 | 16.2 | 4.2 | 5.5 | 3.8 |
| 140° C. | (min.) | >30 | >30 | >30 | 15.5 | 3.6 | 3.9 | 3.1 |
| [Vulcanization speed Tc90] | | | | | | | | |
| 180° C. | (min.) | 8.6 | 8.5 | 8.6 | 7.9 | 8.7 | 7.0 | 6.2 |
| 200° C. | (min.) | 5.4 | 4.3 | 5.4 | 5.1 | 8.0 | 5.1 | 4.1 |
| [Normal state physical properties] | | | | | | | | |
| Hardness | (JIS A) | 77 | 80 | 78 | 74 | 76 | 67 | 68 |
| 100% Modulus | (MPa) | 7.8 | 9.8 | 7.9 | 4.8 | 6.1 | 5.7 | 5.9 |
| Tensile strength | (MPa) | 12.8 | 13.3 | 12.5 | 12.5 | 12.0 | 13.1 | 13.8 |
| Elongation | (%) | 170 | 120 | 170 | 230 | 170 | 240 | 230 |
| [Compression set] | | | | | | | | |
| JIS-Block | (%) | 14 | 14 | 20 | 15 | 7 | 15 | 18 |
| [Processability] | | ○ | ○ | ○ | ○ | X | ○ | ○ |

What is claimed is:

1. An acrylic elastomer composition, which comprises a carboxyl group-containing acrylic elastomer, a polyfunctional isocyanate compound, and at least one of a guanidine, a quaternary onium salt, a tertiary amine and a tertiary posphine as a vulcanization accelerator.

2. An acrylic elastomer composition according to claim 1, wherein the carboxyl group-containing acrylic elastomer is a copolymer obtained by copolymerization of at least one of an alkyl acrylate having an alkyl group having 1 to 8 carbon atoms and an alkoxyalkyl acrylate having an alkoxyalkyl group having 2 to 8 carbon atoms as a main comonomer with 0.1 to 15% by weight of a carboxyl group-containing unsaturated compound on the basis of total monomer mixture.

3. An acrylic elastomer composition according to claim 1, wherein 0.1 to 10 parts by weight of a polyfunctioned isocyanate compound is used per 100 parts by weight of the carboxyl group-containing acrylic elastomer.

4. An acrylic elastomer composition according to claim 1, wherein 0.5 to 15 parts by weight of the vulcanization accelerator is used per 100 parts by weight of the carboxyl group-containing acrylic elastomer.

5. An acrylic elastomer composition, which comprises a carboxyl group-containing acrylic elastomer and a blocked isocyanate.

6. An acrylic elastomer composition according to claim 5, wherein the carboxyl group-containing acrylic elastomer is a copolymer obtained by copolymerization of at least one of an alkyl acrylate having an alkyl group having 1 to 8 carbon atoms and an alkoxyalkyl acrylate having an alkoxyalkyl group having 2 to 8 carbon atoms as a main comonomer with 0.1 to 15% by weight of a carboxyl group-containing unsaturated compound on the basis of total monomer mixture.

7. An acrylic elastomer composition according to claim 5, wherein the blocked isocyanate is a reaction product of a polyfunctional isocyanate and a blocking agent.

8. An acrylic elastomer composition according to claim 7, wherein the blocking agent is an amine, a phenol, an alcohol, an active methylene, a mercaptan, an amide, an imide, an imidazole, a urea, a carbamate, an oxime, a guanidine, a sulfite or a lactam.

9. An acrylic elastomer composition according to claim 5, wherein 0.1 to 15 parts by weight of the blocked isocyanate is used per 100 parts by weight of the carboxyl group-containing acrylic elastomer.

10. An acrylic elastomer composition according to claim 5, wherein at least one of a guanidine, a quaternary onium salt, a tertiary amine and a tertiary phosphine is further contained as a vulcanization accelerator.

11. An acrylic elastomer composition according to claim 10, wherein not more than 15 parts by weight of the vulcanization accelerator is used per 100 parts by weight of the carboxyl group-containing acrylic elastomer.

* * * * *